Sept. 4, 1951 S. ROSE 2,566,995
DOLL'S EYE
Filed April 12, 1946
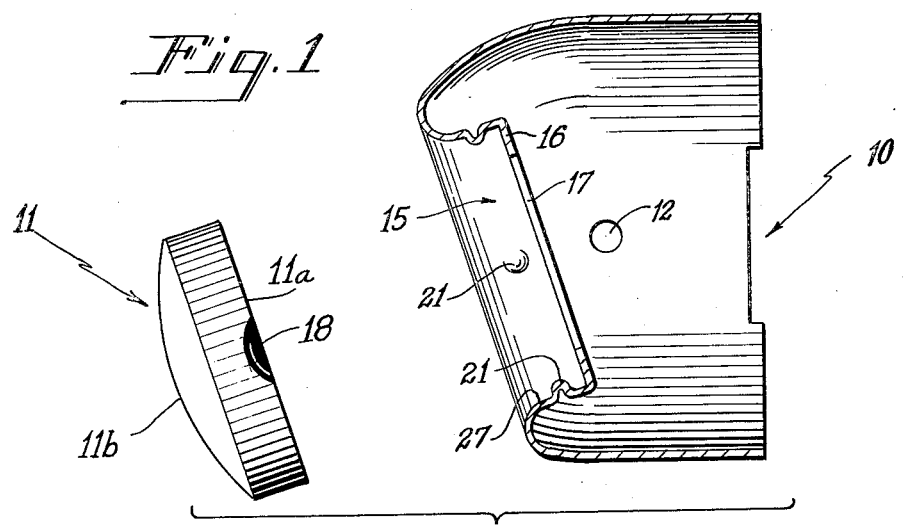
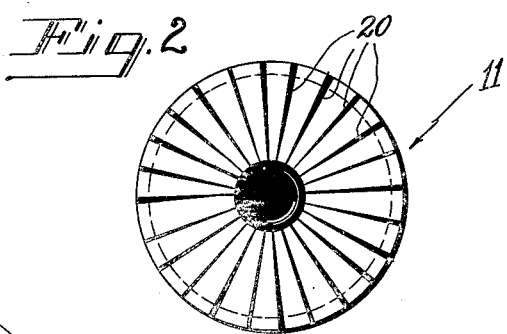
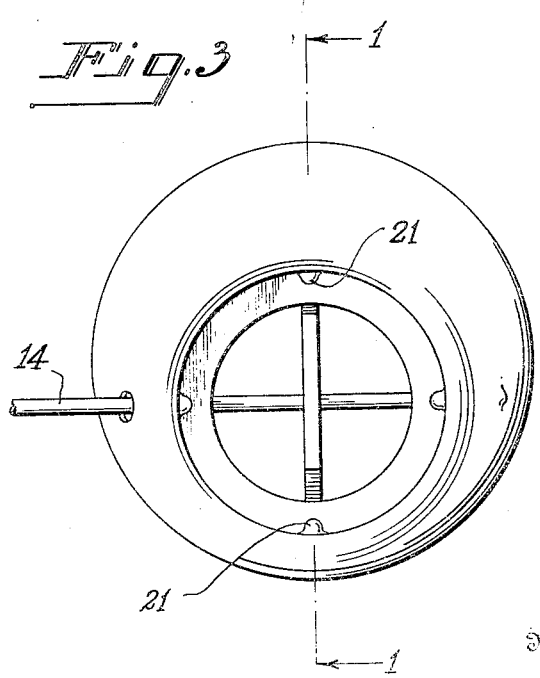
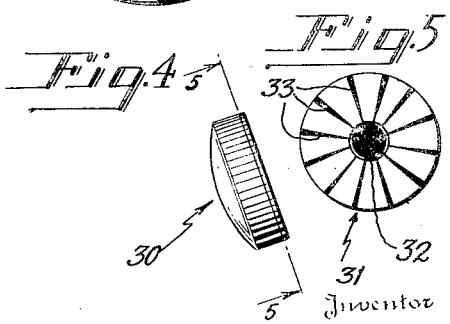
Inventor
SAMUEL ROSE
By Al Winburn
Attorney Patented Sept. 4, 1951

2,566,995

UNITED STATES PATENT OFFICE 2,566,995

DOLL'S EYE

Samuel Rose, Bayonne, N. J., assignor to Margon Corporation, Bayonne, N. J., a corporation of New Jersey Application April 12, 1946, Serial No. 661,539

5 Claims. (Cl. 46—169)

My invention relates generally to dolls' eyes, more particularly my invention is directed towards a highly improved and novel construction for the movable type of dolls' eyes usually employed for sleeping dolls.

One of the main objects of my invention is to provide a doll's eye unit of the class described which shall be characterized by the simplicity of the parts which go to make up the eye unit as well as the ease with which such parts may be assembled, and which shall at the same time represent a general improvement in the art.

Other objects of my invention will become apparent as the description of the invention proceeds or will hereinafter be pointed out.

In the accompanying drawings,

Fig. 1 is a vertical sectional view of the shell portion of the doll's eye of my invention together with the pupil and lens portion disassociated therefrom;

Fig. 2 is a rear elevational view of the pupil and lens part of the doll's eye unit, shown in Fig. 1;

Fig. 3 is a front elevational view of the eye shell shown in Fig. 1 and illustrating the same as mounted upon a cross rod;

Fig. 4 is a view of a modified form of pupil and lens member similar to that shown in Fig. 1 but of smaller size; and Fig. 5 is a cross-sectional view taken substantially along the line 5—5 of Fig. 4.

Referring now in detail to the drawings I have shown a movable doll's eye unit constructed and arranged in accordance with my invention and comprising a shell member 10 and a pupil and lens member 11. The shell 10 may be stamped out of suitable metallic material into substantially hemi-spherical shape of the type customarily employed for making doll's eye shells and may be provided with an opening 12 in one side wall portion thereof, through which there is adapted to be freely passed a shaft or cross rod 14. As is well known in the art, a pair of eye shells such as the shell 10 illustrated in the drawings is generally mounted on the cross rod 14, the said rod 14 in turn being resiliently and rotatably mounted on a support rigidly maintained in the doll's head. One such type of mounting for the eye shells is illustrated and described in my co-pending patent application, Serial No. 657,767.

As clearly shown in Figs. 1 and 3 of the drawings the eye shell 10 is provided with a circular recessed portion 15 formed by pressing the material of the front portion of the eye shell inwardly to provide a bottom wall 16 and a surrounding annular side wall 27. The bottom wall 16 is provided with a central opening 17 of predetermined size. Into the recessed area 15 I frictionally mount my lens and pupil member 11. The said lens and pupil member 11 may be made of any suitable transparent material such as, for example, glass or other plastic material and is made in the form of a circular disc having a substantially straight rear surface 11a and an arcuate front surface 11b in conformity with the curvature of the adjacent outer surface of the eye shell 10. The rear surface 11a of the member 11 is provided with a recessed portion 18 having a rounded bottom wall and disposed at the center thereof, the said portion 18 being suitably colored to simulate the pupil portion of the human eye. Extending radially from the pupil 18 are a series of grooves 20 as clearly shown in Fig. 2 of the drawings, to further simulate the human eye.

It is thus seen from the above description that when the lens and pupil member 11 is frictionally mounted in the recess 15 of the shell 10, the light from the exterior will shine through the said member 11 and due to the opening 17 there will be an appearance of depth to the eye.

The member 11 may be held in the recess 15, by any suitable adhesive means if desired. Also if desired, a series of circumferentially spaced projections 21 may be provided in the surrounding wall 27 to insure a better frictional grip on the member 11.

In Figs. 4 and 5, I have shown a modified form of my invention in which the lens and pupil member 30 is made similar to the member 11 except that in place of the recess 18 and grooves 20 I provide a separate disc 31 overlying the rear surface of the member 30 and on the inner surface of which there is printed or otherwise impressed a pupil simulating center portion 32 and radial portions 33. The disc 31 may be of any suitable material such as plastic or cardboard and may be independent of the member 30 and of such size as to snugly overlie the bottom wall 16 of the shell 10.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having described my invention, I claim as new and desire to secure by Letters Patent:

1. A doll's eye comprising a generally hemispherical shell provided with an inwardly depressed portion in the front part thereof, said depressed portion having a flat circular bottom wall and a surrounding cylindrical side wall, a lens of transparent material frictionally received in said depressed portion, said lens comprising a circular disc having a substantially flat rear wall, an arcuate front wall corresponding in curvature to that of the outer surface of the adjacent shell portion, and an interconnecting cylindrical side wall, the width of said side wall being substantially equal to said predetermined depth of said depressed portion, the diameters of said front and rear walls of said lens being substantially equal, and a central portion of said rear wall being colored to simulate an eye pupil.

2. A doll's eye comprising a generally hemispherical shell provided with an inwardly depressed portion in the front part thereof, said depressed portion having a flat circular bottom wall and a surrounding cylindrical side wall, said bottom wall having a central opening of smaller diameter than said bottom wall, a lens of transparent material frictionally received in said depressed portion, said lens comprising a circular disc having a substantially flat rear wall, an arcuate front wall corresponding in curvature to that of the outer surface of the adjacent shell portion and an interconnecting cylindrical side wall, the width of said side wall being substantially equal to said predetermined depth of said depressed portion, the diameters of said front and rear walls of said lens being substantially equal, and a central portion of said rear wall of said lens being colored to simulate an eye pupil.

3. A doll's eye comprising a generally hemispherical shell provided with an inwardly depressed portion in the front part thereof, said depressed portion having a flat circular bottom wall and a surrounding cylindrical side wall, a lens of transparent material frictionally received in said depressed portion, said lens comprising a circular disc having a substantially flat rear wall, an arcuate front wall corresponding in curvature to that of the outer surface of the adjacent shell portion and an interconnecting annular side wall, said side and rear walls of said lens intersecting at right angles, the width of said side wall being substantially equal to said predetermined depth of said depressed portion, the diameters of said front and rear walls of said lens being substantially equal, and a central portion of said rear wall of said lens being colored to simulate an eye pupil.

4. A doll's eye comprising a generally hemispherical shell provided with an inwardly depressed portion in the front part thereof, said depressed portion having a flat circular bottom wall and a surrounding cylindrical side wall, said side wall being provided with inward projections to insure the frictional maintenance of a lens in said depressed portion, said lens being made of transparent material and being frictionally received in said depressed portion, said lens comprising a circular disc having a substantially flat rear wall, an arcuate front wall corresponding in curvature to that of the outer surface of the adjacent shell portion and an interconnecting annular side wall, the width of said side wall being substantially equal to said predetermined depth of said depressed portion, the diameters of said front and rear walls of said lens being substantially equal, and a central portion of said rear wall of said lens being colored to simulate an eye pupil.

5. A doll's eye comprising a generally hemispherical shell provided with an inwardly depressed portion in the front part thereof, said depressed portion having a bottom wall and a surrounding side wall, a lens of transparent material frictionally received in said depressed portion, said lens comprising a circular disc having a substantially flat rear wall, an arcuate front wall corresponding in curvature to that of the outer surface of the adjacent shell portion and an interconnecting cylindrical side wall, the width of said side wall being substantially equal to said predetermined depth of said depressed portion, the diameters of said front and rear walls of said lens being substantially equal, a central portion of said rear wall of said lens being colored to simulate an eye pupil, and said rear wall being provided with grooves extending radially from the central pupil portion.

SAMUEL ROSE.

REFERENCES CITED

The following references are of record in the file of this patent:

UNITED STATES PATENTS

| Number | Name | Date |
| --- | --- | --- |
| 1,763,312 | Marcus | June 10, 1930 |
| 2,039,928 | Popovich | May 5, 1936 |
| 2,104,540 | Hoffman | Jan. 4, 1938 |
| 2,197,765 | Marcus | Apr. 23, 1940 |
| 2,254,232 | Marcus | Sept. 2, 1941 |